US010918957B2

(12) United States Patent
Witchey (10) Patent No.: US 10,918,957 B2
(45) Date of Patent: *Feb. 16, 2021

(54) APPARATUS AND METHODS OF PHYSICAL GAME COMPONENTS (71) Applicant: VANAV HOLDINGS, Lake Forest, CA (US)

(72) Inventor: Nicholas J. Witchey, Laguna Hills, CA (US)

(73) Assignee: VANAV HOLDINGS, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,802

(22) Filed: Feb. 13, 2014

(65) Prior Publication Data
US 2014/0235353 A1 Aug. 21, 2014

Related U.S. Application Data (60) Continuation of application No. 13/482,521, filed on May 29, 2012, now Pat. No. 8,678,924, which is a
(Continued)

(51) Int. Cl.
*A63F 13/792* (2014.01)
*A63F 13/71* (2014.01)
(Continued)

(52) U.S. Cl.
CPC ............ *A63F 13/792* (2014.09); *A63F 9/24* (2013.01); *A63F 13/12* (2013.01); *A63F 13/71* (2014.09);
(Continued)

(58) Field of Classification Search
CPC .......... A63F 13/00; A63F 13/30; A63F 13/60; A63F 13/58; A63F 13/792; A63F 13/71;
(Continued)

(56) References Cited

U.S. PATENT DOCUMENTS 5,411,259 A 5/1995 Pearson et al.
5,662,332 A 9/1997 Garfield
(Continued)

FOREIGN PATENT DOCUMENTS

EP 1579898 5/2005
EP 1606031 10/2009
(Continued)

OTHER PUBLICATIONS

Ebay, "Community: About eBay: Company Overview: Index" [online], Aug 1, 2001, http://web.archive.org/web/20010801154255/pages.ebay.com/community/about ebay/overview/index/html.
(Continued)

*Primary Examiner* — Jay Trent Liddle
*Assistant Examiner* — Ryan Hsu
(74) *Attorney, Agent, or Firm* — Stetina Brunda Garred and Brucker (57) ABSTRACT Systems, apparatus, and methods relating to a physical object that are associated with a virtual game world are described. Some embodiments of the physical object have an in-game value within the virtual game world. Software operating the virtual game world ascribes purchasing power or attributes having offensive, defensive, opportunity, or set values as their in-game values. Methods associated with the subject matter relate to relocating an asset of the game component from one asset storage area to another asset storage area. When relocated, an asset's authenticity is validated, retrieved from a first storage area, exchanged over a communications interface, or stored in a second asset storage area.

17 Claims, 3 Drawing Sheets

Related U.S. Application Data division of application No. 11/676,780, filed on Feb. 20, 2007, now Pat. No. 8,206,217.

(60) Provisional application No. 60/775,642, filed on Feb. 21, 2006.

(51) Int. Cl.
*A63F 13/85* (2014.01)
*A63F 9/24* (2006.01)
*A63F 13/30* (2014.01)

(52) U.S. Cl.
CPC ........ *A63F 13/85* (2014.09); *A63F 2300/532* (2013.01); *A63F 2300/575* (2013.01); *A63F 2300/69* (2013.01)

(58) Field of Classification Search
CPC .......... A63F 13/85; A63F 13/24; A63F 13/12; A63F 2300/69; A63F 2300/532; A63F 2300/575
USPC ............................ 463/1, 11, 42, 43; 273/292
See application file for complete search history.

(56) References Cited

U.S. PATENT DOCUMENTS

| | | | |
|---|---|---|---|
| 5,748,731 A * | 5/1998 | Shepherd | 705/57 |
| 6,035,280 A | 3/2000 | Christensen | |
| 6,061,656 A | 5/2000 | Pace | |
| 6,322,077 B1 * | 11/2001 | Braunlich et al. | 273/292 |
| 6,435,508 B1 | 8/2002 | Tavel | |
| RE37,957 E | 1/2003 | Garfield | |
| 6,530,571 B1 | 3/2003 | McWilliams | |
| 6,554,702 B2 | 4/2003 | Mahar et al. | |
| 6,623,010 B1 | 9/2003 | Holland, Jr. | |
| 6,688,973 B2 | 2/2004 | Satloff et al. | |
| 6,899,332 B2 * | 5/2005 | Weisman | 273/289 |
| 6,899,333 B2 * | 5/2005 | Weisman | 273/289 |
| 7,037,166 B2 * | 5/2006 | Shrock et al. | 446/175 |
| 7,081,033 B1 * | 7/2006 | Mawle | A63F 13/02 |
| | | | 446/175 |
| 7,111,844 B2 | 9/2006 | Andrie et al. | |
| 7,118,482 B2 * | 10/2006 | Ishihara et al. | 463/43 |
| 7,201,374 B2 | 4/2007 | Bielman | |
| 7,267,342 B2 | 9/2007 | Myrfors et al. | |
| 7,291,052 B2 * | 11/2007 | Ellman et al. | 446/100 |
| 7,314,407 B1 | 1/2008 | Pearson | |
| 7,326,118 B2 | 2/2008 | Shinoda | |
| 7,338,376 B2 | 3/2008 | Eck et al. | |
| 7,465,231 B2 | 12/2008 | Lewin et al. | |
| 7,534,157 B2 | 5/2009 | Ganz | |
| 7,731,194 B2 * | 6/2010 | Ishihara et al. | 273/288 |
| 8,025,573 B2 | 9/2011 | Stenton et al. | |
| 8,062,120 B2 | 11/2011 | Zapata et al. | |
| 8,182,309 B2 * | 5/2012 | Norman | 446/297 |
| 2002/0028710 A1 * | 3/2002 | Ishihara et al. | 463/44 |
| 2002/0040929 A1 | 4/2002 | Bramucci | |
| 2002/0052238 A1 | 5/2002 | Muroi | |
| 2002/0137563 A1 | 9/2002 | Kawazu | |
| 2003/0037075 A1 | 2/2003 | Hannigan et al. | |
| 2003/0050831 A1 | 3/2003 | Klayh | |
| 2003/0085797 A1 | 5/2003 | Li | |
| 2004/0229696 A1 | 11/2004 | Beck | |
| 2004/0266505 A1 | 12/2004 | Keam et al. | |
| 2005/0059483 A1 | 3/2005 | Borge | |
| 2005/0192864 A1 | 9/2005 | Ganz | |
| 2005/0258598 A1 | 11/2005 | Myrfors et al. | |
| 2006/0003843 A1 * | 1/2006 | Kobayashi et al. | 463/43 |
| 2006/0030410 A1 | 2/2006 | Stenton et al. | |
| 2006/0040746 A1 | 2/2006 | Eguchi et al. | |
| 2006/0145421 A1 | 7/2006 | Yu et al. | |
| 2006/0160607 A1 | 7/2006 | Okada | |
| 2006/0178201 A1 * | 8/2006 | Okada | G07F 17/3255 |
| | | | 463/20 |
| 2006/0178975 A1 | 8/2006 | Jung et al. | |
| 2006/0183543 A1 | 8/2006 | Yagi | |
| 2006/0234795 A1 * | 10/2006 | Dhunjishaw et al. | 463/42 |
| 2006/0284373 A1 | 12/2006 | Kenney et al. | |
| 2007/0060315 A1 | 3/2007 | Park | |
| 2007/0197275 A1 | 8/2007 | Gagner | |
| 2008/0012228 A1 | 1/2008 | Shideler et al. | |
| 2008/0045283 A1 | 2/2008 | Stamper et al. | |
| 2008/0045330 A1 | 2/2008 | Chim | |
| 2008/0235323 A1 | 9/2008 | Block | |

FOREIGN PATENT DOCUMENTS

| | | |
|---|---|---|
| GB | 2416710 | 7/2005 |
| WO | 99/37370 | 7/1999 |
| WO | 01/58544 | 8/2001 |
| WO | 02/01494 | 1/2002 |
| WO | 03/057328 | 7/2003 |
| WO | 2004/024255 | 3/2004 |
| WO | 2006/020811 | 2/2006 |
| WO | 2006/135534 | 12/2006 |
| WO | 2007/066238 | 6/2007 |

OTHER PUBLICATIONS

Magerkurth, C., et al., "Augmenting the Virtual Domain with Physical and Social Elements: Towards a Paradigm Shift in Computer Entertainment Technology", International Conferences on Advancements in Computer Entertainment Technology, Singapre, Jun 3-5, 2004, pp. 163-172.

\* cited by examiner

APPARATUS AND METHODS OF PHYSICAL GAME COMPONENTS

This application is a continuation of U.S. patent application Ser. No. 13/482,521 filed May 29, 2012, which is a divisional of U.S. patent application Ser. No. 11/676,780 filed Feb. 20, 2007, which claims priority to U.S. Provisional Application No. 60/775,642, filed Feb. 21, 2006, all of which are incorporated by reference herein in their entirety.

FIELD OF THE INVENTION

The field of the invention relates to physical game components.

BACKGROUND OF THE INVENTION

Markets for physical game components have grown dramatically since the introduction of the collectible trading card game Magic: The Gathering in 1993 by Wizards of the Coast™, now owned by Hasbro™. U.S. Pat. Nos. 5,662,332 and RE37,957, both titled "Trading Card Method of Play" describe the main concepts of the game. Also, witness the success of Wizkids Games™ the producers and sellers of games including HeroClix™ and Pirates of the Spanish Main™. U.S. Pat. Nos. 6,899,332 and 6,899,333 both titled "Game piece and method of playing a game and supplying the game piece." While the above referenced patents and others in the same category contemplate physical game components and playing the associated core games over a computer, they do not contemplate that the physical game components have an in-game value within a virtual game world.

Massively Multi-player On-ling Games (MMOG) are also very well known and popular. Examples include World of Warcraft™, owned and operated by Blizzard™ or EverQuest™ owned and operated by Sony On-line Entertainment (SOE). In MMOGs, generally, characters collect virtual objects within the game that have in-game value. The virtual objects have parameters or attributes associated with them in a manner game players find beneficial due to their in-game purchasing power, enhancement abilities, or other capabilities. Frequently, the virtual objects have a rarity value or set value associated with them that increases their collectability; consequently, players play longer and revenue increases. Unfortunately, the virtual objects are retained within the Virtual Game World (VGW) and do not leave the servers. However, the collectability and virtual nature of the game has spawned markets where players sell the virtual objects on eBay™ or even in the VGW through in-game markets or auction houses. Such markets of virtual objects require players to conduct a transaction, and then meet virtually in the game world to exchange the virtual object. This approach to the market for objects having in-game value is subject to fraud. Interestingly, the concepts of physical game components have not yet combined with in-game value to reduce the risk of fraud.

The following references relate to various aspects of game components and VGWs including apparatus representing physical game components, toys, using a computer to facilitate game play, or virtual objects and their transactions:

U.S. Patent Applications Numbers:

| | | |
|---|---|---|
| 2005/0287925; | 2005/0266907; | 2005/0216346 |
| 2005/0182693; | 2005/0049022; | 2004/0229696 |
| 2004/0172280; | 2004/0145563; | 2004/0092311 |
| 2004/0084842; | 2003/0115132; | 2003/0037075 |
| 2003/0004887; | 2002/0183119; | 2002/0155893 |
| 2002/0109295; | 2002/0107783; | 2002/0072413 |
| 2002/0022516; | 2001/0056393 | |

U.S. Pat. Nos.

| | | | | |
|---|---|---|---|---|
| 6,949,033; | 6,910,627; | 6,745,236; | 6,612,501; | 6,591,250 |
| 6,341,353; | 6,200,216; | 6,119,229; | 6,507,828; | 6,009,458 |
| 5,853,327; | 5,810,666; | 5,689,561 | | |

U.S. Patent Application 2005/0192864 titled "System and method for toy adoption and marketing" by Howard Ganz describes a toy and methods of playing with the toy in virtual world. The described toy has registration codes allowing a toy to be authenticated with respect to an on-line virtual world where users are able to "adopt" the toy. Once authentication (the adoption) is complete, a virtual version of the toy interacts in the virtual world. Although the Ganz patent teaches the virtual version of the toy is able to earn or to find virtual objects that have an in-game value, the patent does not teach associating the in-game value with a physical object. For example, a virtual version of the toy can earn "virtual cash" stored in the virtual world; however, the "virtual cash" does not have a corresponding physical object in the real world.

Although the above references relate to the inventive subject matter, none of the references teach the concept of physical game objects having an associated in-game value within a VGW.

Thus, there remains a considerable need for methods and apparatus that provide physical objects that have an in-game value within a VGW. In addition, there will be a need for relocating assets associated with the physical objects between asset storage areas.

SUMMARY OF THE INVENTION

The inventive subject matter is directed toward a physical object having an interface that communicates with a VGW. The VGW associates an in-game value with the object. Various embodiments of the physical object include a memory storing an asset that cooperates with software identifying the object to the VGW. Embodiments of the interface include wired or wireless connections. For example, a wireless connection could comprise RFID, IrDA, 802.11, Bluetooth, wireless USB, even a user, or other forms of wireless connections. Examples of wired connections include USB, Firewire, Ethernet, or other wired connections. Some embodiments of the physical object comprises a figurine representing a being in the VGW, an inanimate object in the VGW, currency in the VGW or other items related to the game world including meta items that might not be depicted to user.

In one embodiment, software that operates the VGW associated with physical object comprising instructions for a user interface that ascribes purchasing power, an offensive attribute, a defensive attribute, an opportunity attribute, a rarity attribute, a set attribute, or other parameter that can represent an in-game value.

Other embodiments of the inventive subject matter include a web site that offers the physical object for sale, for purchase, for trade, or for other forms of transactions.

The inventive subject matter also comprises methods relating to relocating an asset of a game component. In some embodiments, the game component has an asset communication interface and an asset storage area where the asset is stored. The embodiment of some of the methods are contemplated to include steps involving validating the asset's authenticity, retrieving the asset from the asset storage area, exchanging the asset over the asset communication interface, or storing the asset in a second asset storage area which could include a database. Other embodiments of the methods include securing at least part of the connection with the game component. In yet other embodiments the asset is exchanged through a proxy. Furthermore, the methods could comprise deleting the asset from an asset storage area.

Other contemplated embodiments include methods of producing a collectible game component having an asset storage area. The methods are contemplated to include producing the game component based on a rarity policy and storing a re-locatable asset in the asset storage area. In some embodiments of the methods, the step of producing the game component includes manufacturing a physical form for the game component.

GLOSSARY

The following descriptions refer to terms used within this document. The terms are provided to ensure clarity when discussing the various aspects of the invention matter, without implied limitations, and to reduce repetition within the body of the document.

The term "in-game value" as used herein has a broad meaning and should be interpreted to its fullest possible extent. Contemplated types of values, either real or virtual, include tangible or intangible values. An example of a tangible value includes fixed or variable values. A fixed value includes a literal, integer, floating point, string, or other data that can be displayed to a player. Such a fixed value generally has set information used within the game. For example, a weapon's damage or the weapon's monetary costs could be fixed values. A variable value includes values that can fluctuate as time or circumstances change within the VGW or outside the VGW. To continue with the weapon example, the weapon's damage might degrade over time or after a number of uses. Monetary values represent real or virtual currency that expresses worth and can be a fixed value or a variable value. Intangible values represent those that can not necessarily be represented to a player, do not necessarily relate to the game in general, or do not necessarily impact game play. An example of an intangible value includes something that is prized. A prized value relates to how a player desires the object. For example, a player might wish for their character to have a particular cosmetic appearance in the VGW. The cosmetic appearance does not affect game play, nor might other players desire the same appearance; however, the cosmetic appearance has an "in-game value" to the player.

The teachings herein may be advantageously employed by developers of game systems, both real and virtual. Physical objects associated with game components may be employed to generate revenue for the developers or enjoyment for those that play, or possibly collect, the objects.

Various objects, features, aspects, and advantages of the present invention will become more apparent from the following detailed description of the preferred embodiments of the invention, along with the accompanying drawings in which like numerals represent like components.

DETAILED DESCRIPTION

The following detailed description relates to one or more preferred embodiments of the inventive subject matter. In no way should the descriptions be construed to limit the nature of the inventive subject matter. The descriptions provided should be interpreted to their broadest possible extent.

Physical Objects Having In-Game Values

Figure 1:
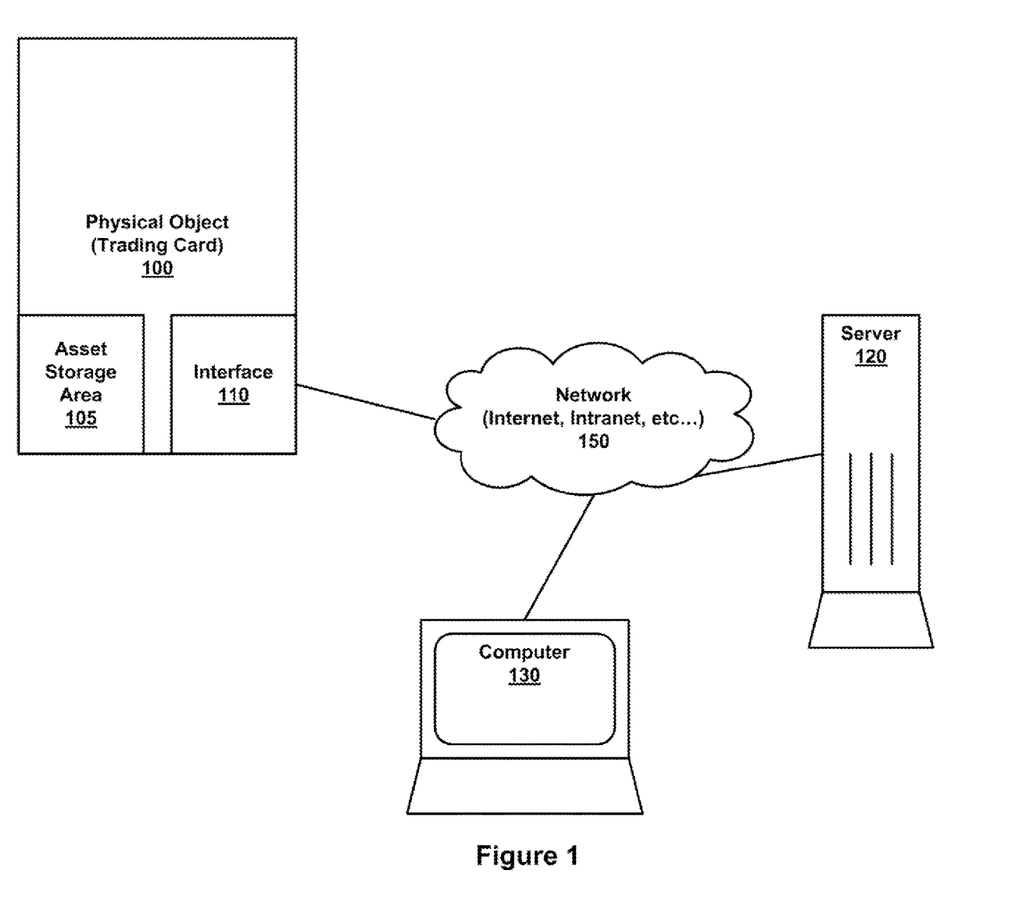
FIG. 1 presents a possible embodiment of a physical object.

FIG. 1 presents a possible embodiment of a physical object. Physical object 100 comprises asset storage area 105 or interface 110. Interface 110 enables physical object 100 to connect to remote systems including computer 130 or server 120 over network 150.

Physical object 100 represents a real-world physical thing. In some embodiments, physical object 100 is a game component, possibly a collectible trading card having two sides, a figurine, a die, a pawn, a game board, or other item that can be used in a game. In other embodiments, physical device 100 composes a larger object. For example, physical object 100 could represent a weapon that is wielded by a figure wherein the weapon has value in a VGW.

Asset storage area 105 represents a media used to store information associated with physical object, preferably information associated with the object's in-game value. Contemplated storage areas include flash, ROM, RAM, magnetic media, optical media, printed matter, or other means for storing information. As an example, consider a trading card representing physical object 100 having an RFID tag. In the example the RFID tag is an embodiment of storage area 105. Alternatively, the trading card could employ a printed bar code or a magnetic strip as asset storage area 105.

Some embodiments of asset storage area 105 store an electronic asset that cooperates with software to identify the physical object 100 to the VGW. The term "asset" should be broadly interpreted to mean data associated with the object. An asset includes concepts involving simple ID numbers to complete data structures having members or even instructions for a processing unit. In some embodiments the asset comprises bit field ID, for example a 128-bit GUID, which is used by the software or the VGW to associate the in-game value with physical object 100. In other embodiments, the identifier comprises additional object information relating to the parameters associated with the object itself, both physical and virtual version. Examples of object information includes time of manufacture, status of object, time left to use, number of charges, associations to other VGW elements, or other information that enhances value associated with physical object 100.

Interface 110 provides a communication link between physical object 100 and the VGW, possibly running on computer 130 or server 150. Due to the larger number of possible embodiments of physical object 100, interface 110 can take many forms including wired or wireless connections. Contemplated wired connections include proprietary connections that interface to computer 130, USB, Firewire, direct physical contacts, or other forms of physical interfaces. Contemplated wireless connections include RFID, IrDA, 802.11, Bluetooth, a user, optical reader, or other connections that do not require physical contact. In some embodiments, an asset reader (not shown) reads the asset information stored in asset storage area 105 through interface 110 and then transfers the asset information to computer 130 or server 150 running the VGW. In a preferred embodiment, computer 130 operates as an asset reader.

Specifically contemplated embodiments of physical object 100 include a figurine that is associated with the VGW. In a preferred embodiment, the figurine can be an animate or in-animate object within the context of the game. Examples of animate objects include characters, animals, or other objects that can move within the VGW. Examples of in-animate objects include currency, weapons, armor, transportation, or other items that would normally be considered in-animate. In addition, the figure could also be associated with meta-items that are incorporeal objects with respect to the VGW. For example, a player collects a key that opens new content within the VGW.

A preferred VGW operates according to software running on computer 130 or server 120. The software in a preferred embodiment, runs remotely on server 120 to provide a MMOG environment where many players share the gaming experience; however, it is contemplated that computer 130 could also run the software to provide the VGW or provide a user interface into the VGW. Embodiments of computer 130 include general purpose computers, game consoles, hand-helds, or other computing platforms. Additionally, the software ascribes an in-game value associated with physical object 100. Contemplated in-game values include purchasing power, or attributes that relate to in-game objects include offensive, defensive, opportunity, set, or other attributes. Offensive and defensive attributes possibly alter the combat effectiveness of in-game objects. Opportunity attributes possibly alter random events within the VGW. Set attributes are attributes that change as pieces of a set of objects are combined. An example of set attributes include having a first set of attributes associated with a piece of armor composing a armor set and then the first set changes to a second set when additional pieces of the armor set are found.

All VGW embodiments are contemplated. As mentioned previously, a MMOG represents one possible VGW; however, other contemplated VGW include on-line forums, Internet arcades, on-line communities, or other virtual interaction foci where people gather. For example, physical object 100 could represent an avatar on an on-line forum or a badge providing access to certain games within an internet arcade similar to Yahoo! Games.

One should appreciate the utility of having physical objects that have intrinsic value as well as value within an on-line game. Therefore, preferably, a web site or other on-line system allows owners of physical object 100 to trade, sell, purchase, discuss, or engage with others that have interest in the VGW or physical object 100.

Re-Locating an Asset Associated with a Virtual Game World

Figure 2:
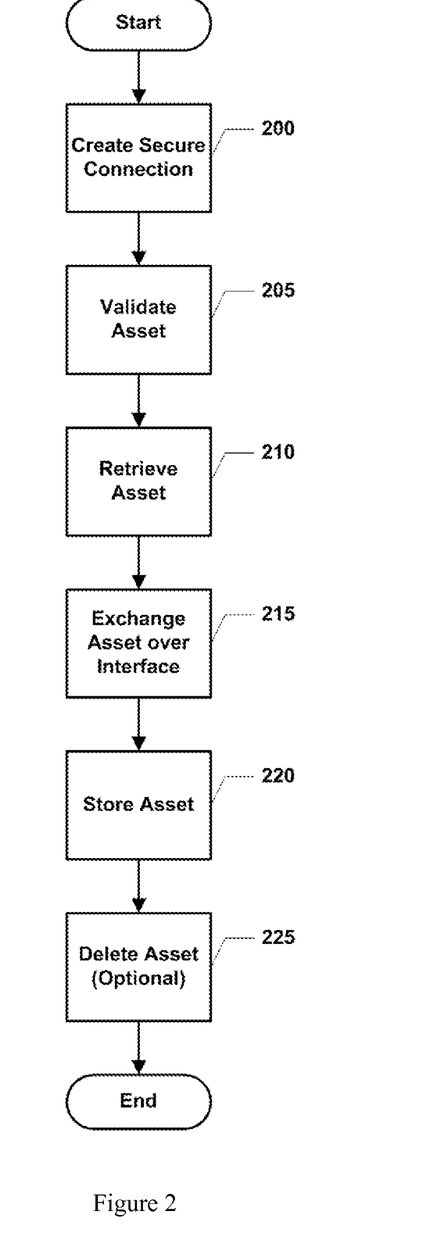
FIG. 2 presents a possible embodiment of a method for re-locating an asset.

FIG. 2 presents a possible embodiment of a method for re-locating an asset. Those skilled in the art of MMOG recognize that VGWs are dynamic environments where virtual objects are created, destroyed, changed, or manipulated in a myriad of different ways. Therefore, in a preferred embodiment an asset of a game component can be re-located from an asset storage area of the game component to another asset storage area.

At step 200, a secure connection is established to facilitate the communication of the assets between the game component and the VGW. Secure connections include SSL, SSH, or other forms of security that ensure confidentiality, authentication, or data integrity. One should note that the secure connection could be limited in extent and might not extend completely to the game component. For example, a game component having an RFID tag would be read by an RFID tag reader. The tag reader could then establish the secure connection to the VGW.

At step 205 the software operating the VGW validates the authenticity of the game component. There are numerous validation techniques that can be employed including those developed by VeriSign™ or Digimarc™, public key infrastructure, or other possible validation techniques.

Once the asset has been authenticated, at step 210, the asset is retrieved from the game component. Retrieving the asset in some embodiment involves copying the asset information from the asset storage area to memory where the information can be transmitted. In other embodiments, the asset is scanned by a reader (a bar code or RFID reader).

At step 215, the asset is transferred over the asset communication interface to the VGW software. In preferred embodiments, the asset is transferred over a TCP/IP connection to a remote VGW server; however, other data transports are also contemplated. Once transferred, the asset is stored in a second asset storage area at step 220. Preferably the second asset storage area is a database associated with the VGW.

At step 225, the asset can be optionally deleted from the first asset storage on the game components. This step is advantageous when the asset has a lifetime or number of charges associated with it. As a player plays in the VGW, the VGW software updates the asset information, including deleting the asset, to reflect the use of the game component. For example, if a game component can only be used three times, each time the component is used, then the "charge" count is decreased.

Creating a Game Component Having an In-Game Value

Figure 3:
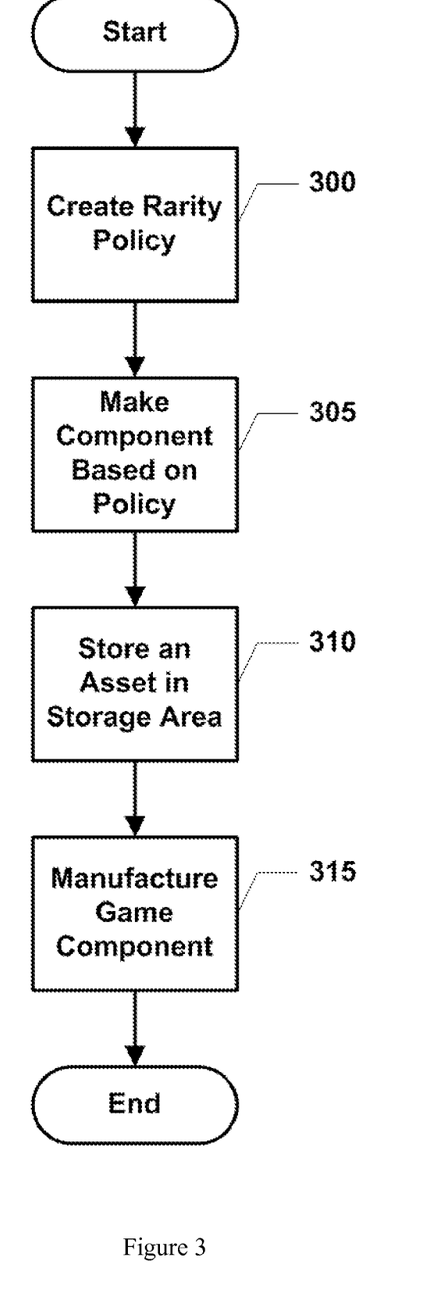
FIG. 3 presents a possible embodiment of a method for producing a game component.

The inventive subject matter also encompasses methods of production. FIG. 3 presents a possible embodiment of a method for producing a game component. In a preferred embodiment, a game component having an asset storage area and an in-game value within a VGW also has an intrinsic collectible value. Therefore, the game component is created based on a rarity policy. The asset storage area stores a re-locatable asset generally associated with in-game value of the game component. As the game component interacts the software associated with the VGW, the re-locatable asset can be copied, moved, or manipulated.

At step 300 a rarity policy is created. A rarity policy determines how many of a particular type of game component is produced. By limiting the production run or limiting the availability of game components, the value of their collectability can be controlled thereby increasing the potential for the primary or secondary markets. Contemplated policies have rarity spectrum including common, uncommon, rare, ultra rare, unique, or other levels. In a preferred embodiment, the rarity policy associates with a VGW. One possible association includes the rarity of an item in the VGW directly influences the rarity of the physical game component.

At step 305, the component is created in accordance with the rarity policy. In some embodiments, making the game component comprises possible additional steps including designing, laying out art work, generating game rules associated with the component, assigning an in-game value, prototyping, or other steps that pertain to the conception or creation of the game component.

Once a game component is created, at step 310 a re-locatable asset is stored in the asset storage area. Storing the asset can comprise different steps depending on the form of the asset storage area takes. For example, if the asset storage area is an RFID tag where the re-locatable asset comprises the tag's ID, the tag is placed within the game component. Alternatively, if the asset storage is a flash memory where the re-locatable is a data structure, the asset is stored in the flash. In some embodiments, the re-locatable asset can be stored in the asset storage area before the asset storage area is placed within, on, around, or otherwise associated with the game component. Furthermore, it is contemplated that the re-locatable asset can be stored in a database associated with the VGW before the game component is manufactured.

Once all prototyping is complete or when ready, at step 315 the game component is manufactured. Again, due the shear number of possible embodiments of the game component, the step of manufacturing can take on nearly any possibility including printing cards, casting figurines, or other manufacturing steps to make the physical form of the game component.

One skilled in the art of game development, either physical or virtual, will appreciate the steps involving production of game components could occur in a different order to reflect the needs of the business or the market.

Transferring Value Between Games and with the Real World

It is further contemplated herein that a given object can be used to transfer or represent values in different games and worlds. Thus, for example, a player might well play a first game to develop an in game value, say 100,000 shekels. The object could be used to store that game value, and the object could be sold as a physical object on eBay™ or even in a retail store for dollars or other real world currency. Alternatively, the object could access some equivalence table (probably on the Internet), where the 100,000 shekels in one gaming world could be traded or sold to another player for perhaps 5,000 gold bars in another gaming world.

One could also transfer the value according to some equivalence table to a real world debit card. This concept was commercialized in May 2006 by the developers of Project Entropia, an online role-playing game that has a real world cash economy. See, for example, http://news.bbc.co.uk/2/hi/technology/4953620.stm.

EXAMPLE EMBODIMENT

The following example embodiment is presented for clarity to indicate how the inventive subject matter can be employed. The example should not be construed as limiting the nature of the inventive subject matter to the presented embodiment.

In one embodiment, a physical object representing a game component includes a figurine that represents a character in a VGW. The figurine comprises an RFID tag that identifies the figurine to the VGW. The ID of the RFID tag represents the asset associated with the figurine. An example of a figurine could include a Wizkids HeroClix miniature or a Wizards of the Coast D&D Miniature figurine.

When a game player wishes to play with the figurine within the VGW, the player places the figurine on an asset reader. Examples of VGW include Blizzard's World of Warcraft, SOE Star Wars Galaxies, or even D&D On-line. The asset reader within this embodiment comprises an RFID reader connected to the player's computer. The reader reads the figurine's RFID tag ID then communicates the ID to software on the computer, possibly through a USB connection or a Bluetooth connection. The software on the computer contacts the software operating the VGW to authenticate the figurine or establish a connection with the VGW. Once the connection is established and the player logs into the VGW, they would see a virtual representation of the figurine.

Other figurines can be purchased by the player to enhance play value or to complete sets of collections. For example, additional figurines include armor or weapons. As the player purchases additional "booster packs" of figurines, he may obtain a rare weapon, the player adds the weapon to his figurine on the asset reader, possibly even having the figurine hold the weapon. The reader again notifies the software operating the VGW, and the weapon appears and is associated with the in game character. The weapon and character both have in-game value due to their attributes associated with the game.

As a player collects figurines, he might complete sets or build the collection to the point where the player wishes to trade for other figurines, sell his collections, or conduct other transactions. Because the figurines now have intrinsic value and have an in-game value, the market for the figurines is increased.

Another contemplated figurine includes a "blank" that can be used to capture in-game value. For example, a player obtains a back pack figurine where the asset storage area is empty. As the player plays in the in-game world, the back pack fills with currency. Now, the player has a physical real-world representation of an in-game object. The back pack can be traded, purchased, or sold without virtual interaction.

Advantages

Those skilled in the art of collectible games or those that play within VGW will appreciate the advantages of the inventive subject. A player who has made money by playing within VGW, now has a method of conducting the sale of their efforts without having to conduct a virtual exchange in the VGW. In addition, should a VGW fail, the physical objects associated with the game can retain their value after the VGW becomes defunct. Companies that produce collectible games increase their market by associating their game components with on-line game companies, possibly achieving a monthly revenue stream from VGW subscribers.

Hardware

Another aspect relates to hardware associated with the inventive subject matter. It is contemplated that one could develop hardware for storing, prototyping, manufacturing, manipulating, managing, packaging, physically controlling or supporting, or for other activities associated with the physical aspects of the inventive subject matter. Therefore, the inventive subject matter includes systems, methods, or apparatus for developing, producing, manufacturing, or running the hardware. In this sense, the hardware falls within the scope of the inventive subject matter.

Software

In still another aspect, it is contemplated that one could write software that would configure, simulate, or manage aspects of the inventive subject matter and their associated infrastructure. From that perspective the inventive subject matter includes methods of writing such software, recording the software on a machine readable form, licensing, selling, distributing, installing, or operating such software on suitable hardware. Moreover, the software per se is deemed to fall within the scope of the inventive subject matter.

Additional Considerations

The following items represent additional considerations that pertain to the inventive subject matter:

Controlling counterfeiting of the physical game component as a function of "acceptable loss"

Creating off-line games where the physical game components can be used by players that do not play within the VGW Licensing the inventive subject matter to advertisers to sell their products within the VGW Offer a player-to-player authentication service to aid people selling or trading game components. The players gain additional confidence they are purchasing a valid item Game components can move in response to in-game activities Adding a display to the game component to indicate activity or validity of the component Thus, specific compositions and methods of physical objects having in-game value within a VGW have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A computer-based gaming system comprising:

a computer game server that operates a virtual game world;

at least one first collectible physical real-world figurine depicting an in-game character within the virtual game world, the at least one first figurine having:

a first non-transitory computer readable memory including a first asset storage area storing at least one representation of a first in-game re-locatable asset as a first re-locatable asset data structure associated with a computer game including the virtual game world, wherein production of the at least one first figurine is influenced by a corresponding in-game virtual representation of the at least one first figurine described by data members of the first re-locatable asset data structure and constituting the in-game character within the virtual game world; and a wireless connector coupled with the first asset storage area and responsive to radio frequencies;

an electronic radio frequency wireless asset reader capable of wirelessly connecting with the at least one first figurine via the wireless connector; and at least one second, separate, collectible physical real-world figurine having a second asset storage area configured to store a representation of a second asset associated with the computer game, wherein the at least one second figurine manufacture is influenced by a corresponding in-game virtual representation of the at least one second figurine, the at least one second figurine depicting an in-game combinable object, the virtual representation of the at least one second figurine having an in-game functional relationship with the virtual representation of the character depicted by the at least one first figurine, wherein the at least one second figurine is physically attachable to the at least one first figurine such that the physical attachment of the at least one second figurine to the at least one first figurine mirrors the functional relationship of the virtual representation of the combinable object depicted by the at least one second figurine and the virtual representation of the character depicted by the at least one first figurine;

wherein the computer game server comprises a second non-transitory computer readable memory and a processing unit that, upon execution of software instructions stored in the second memory, performs operations comprising:

hosting the computer game;

providing to a user a user interface into the virtual game world;

establishing a connection with the at least one first figurine via the wireless connector through the electronic radio frequency wireless asset reader;

ascribing an in-game value to the at least one first figurine and related to the virtual game world based on game play within the virtual game world according to the software instructions, the in-game value representing a use attribute of the virtual representation of the at least one figurine as a function of play by the user within the virtual game world, the use attribute defining a status of the in-game character within the virtual game world;

presenting the in-game value to the user via the user interface;

storing, in the second memory, the first re-locatable asset data structure associated with the in-game virtual representation of the at least one first figurine, the first re-locatable asset data structure's data members having parameters associated with the virtual representation of the at least one first figurine and including one or more parameters associated with the in-game value ascribed to the at least one first figurine based on the game play and representing the use attribute;

updating, via the electronic radio frequency wireless asset reader, the first re-locatable asset data structure in the first asset storage area in the first memory of the at least one first figurine to include the one or more parameters associated with the in-game value ascribed to the at least one first figurine based on the game play and representing the use attribute;

hosting the corresponding virtual representation of the at least one first figurine in the game by cooperating with the first re-locatable asset data structure's data members stored in the at least one first figurine, the virtual representation including the in-game value derived from the one or more parameters from the first re-locatable asset data structure updated via the electronic radio frequency wireless asset reader;

obtaining second asset information associated with the second asset from the second asset storage area via the electronic radio frequency wireless asset reader; and hosting a corresponding virtual representation of the at least one second figurine in the computer game by cooperating with the representation of the second asset stored in the second asset storage area, the virtual representation of the at least one second figurine having an in-game value associated with parameters of the second asset.

2. The system of claim 1, wherein the first asset storage area comprises a radio frequency tag.

3. The system of claim 1, wherein the computer game server further comprises a communication interface configured to connect to the electronic radio frequency wireless asset reader.

4. The system of claim 3, wherein the communication interface comprises a wireless interface.

5. The system of claim 3, wherein the communication interface comprises a wired interface.

6. The system of claim 1, wherein the computer game server comprises a remote virtual game world server.

7. The system of claim 1, wherein the computer game server comprises a game console.

8. The system of claim 1, wherein the computer game server comprises a hand held device.

9. The system of claim 1, wherein the at least one second figurine comprises at least one of a weapon figurine, an armor figurine and a transport figurine.

10. The system of claim 1, wherein the first re-locatable asset data structure can be re-located, via the computer game server, from the first asset storage area to the second asset storage area.

11. The system of claim 1, wherein the first in-game re-locatable asset is influenced by a figurine rarity policy of the at least one first figurine.

12. The system of claim 11, wherein the computer game server is further configured to host the corresponding virtual representation of the at least one first figurine in the game by cooperating with the first in-game re-locatable asset and based at least in part on the figurine rarity policy of the at least one first figurine.

13. A computer-based gaming system, comprising:
at least one first collectible physical real-world figurine depicting an in-game character within a computer-based virtual game, the at least one first figurine having a first non-transitory, tangible computer readable memory that is responsive to radio frequencies,
wherein the first memory includes at least one first electronic asset storage area storing at least one identifier relating to at least one first parameter associated with a real version and a virtual version of the at least one first figurine, the virtual version of the at least one first figurine constituting the in-game character within the computer-based virtual game, and
wherein the at least one first parameter further represents an in-game value within the computer-based virtual game according to the virtual version of the at least one first figurine;
an electronic radio frequency wireless asset reader configured to read at least the at least one identifier relating to the at least one first parameter via radio frequency;
at least one second, separate, collectible physical real-world figurine having a second asset storage area configured to store a representation of a second parameter associated with the computer game, wherein the at least one second figurine manufacture is influenced by a corresponding in-game virtual representation of the at least one second figurine, the at least one second figurine depicting an in-game combinable object, the virtual representation of the at least one second figurine having an in-game functional relationship with the virtual representation of the character depicted by the at least one first figurine, wherein the at least one second figurine is physically attachable to the at least one first figurine such that the physical attachment of the at least one second figurine to the at least one first figurine mirrors the functional relationship of the virtual representation of the combinable object depicted by the at least one second figurine and the virtual representation of the character depicted by the at least one first figurine; and
a computer-based game device communicatively coupled with the electronic frequency wireless asset reader via an electronic communication interface, the computer-based game device comprising at least one processor and a second non-transitory computer readable memory storing software instructions, the computer-based game device being configurable upon execution of the software instructions by the processor to perform operations comprising:
providing to a user a user interface into the computer-based virtual game;
receiving, via the electronic communication interface, at least the at least one identifier relating to the at least one first parameter from the electronic radio frequency wireless asset reader;
presenting, via the user interface, the in-game value to the user based on the at least one first parameter associated with the real version and the virtual version of the at least one first figurine, wherein the in-game value presented to the user via the user interface represents a use attribute of the virtual version of the at least one first figurine as a function of play by the user within the computer-based virtual game, the use attribute defining a status of the in-game character within the computer-based virtual game; and
obtaining second asset information associated with the second parameter from the second asset storage area via the electronic radio frequency wireless asset reader, wherein the corresponding virtual representation of the at least one second figurine in the computer game has an in-game value associated with the second parameter.

14. The computer-based gaming system of claim 13, wherein the at least one first electronic asset storage area comprises an RFID tag.

15. The computer-based gaming system of claim 14, wherein the at least one identifier relating to the at least one first parameter comprises an ID of the RFID tag.

16. The computer-based gaming system of claim 13, wherein the computer-based game device comprises one or more devices selected from the group consisting of: a game console, a hand-held device, a computer, and a game server.

17. The computer-based gaming system of claim 13, wherein the at least one first figurine is produced according to a rarity policy and the at least one first parameter reflects a rarity of the at least one first figurine.

* * * * *